US007727403B2

(12) United States Patent
Kim et al.

(10) Patent No.: US 7,727,403 B2
(45) Date of Patent: Jun. 1, 2010

(54) AUTOMATED SIMULTANEOUS SEPARATION SYSTEM FOR RADIONUCLIDES IN MULTIPLE SAMPLES AND A METHOD FOR AUTOMATICALLY SEPARATING URANIUM (U) USING THE SAME

(75) Inventors: Cheol-Su Kim, Daejeon (KR); Byung-uck Chang, Daejeon (KR)

(73) Assignee: Korea Insitute of Nuclear Safety, Taejon (KR)

( * ) Notice: Subject to any disclaimer, the term of this patent is extended or adjusted under 35 U.S.C. 154(b) by 217 days.

(21) Appl. No.: 11/919,969

(22) PCT Filed: Feb. 10, 2006

(86) PCT No.: PCT/KR2006/000481

§ 371 (c)(1),
(2), (4) Date: Nov. 6, 2007

(87) PCT Pub. No.: WO2007/083856

PCT Pub. Date: Jul. 26, 2007

(65) Prior Publication Data

US 2009/0020476 A1 Jan. 22, 2009

(30) Foreign Application Priority Data

Jan. 19, 2006 (KR) ...................... 10-2006-0005730

(51) Int. Cl.
*B01D 15/08* (2006.01)

(52) U.S. Cl. ....................... 210/656; 210/682; 210/143; 210/198.2

(58) Field of Classification Search ................. 210/656, 210/682, 143, 198.2; 423/2, 3, 6, 7; 422/70
See application file for complete search history.

(56) References Cited

U.S. PATENT DOCUMENTS 5,425,063 A * 6/1995 Ferrieri et al. .............. 376/195

(Continued)

FOREIGN PATENT DOCUMENTS

KR 20-0262106 2/2002

(Continued)

OTHER PUBLICATIONS

PTO 10-0675 Translation of Korean Patent Application No. 10-2004-0015449.*

(Continued)

*Primary Examiner*—Ernest G Therkorn
(74) *Attorney, Agent, or Firm*—McDermott Will & Emery LLP

(57) ABSTRACT

Disclosed herein are an automated simultaneous separation system for radionuclides in multiple samples and a method for automatically separating uranium (U) using the same, which can automatically and simultaneously separate multiple samples. The automated simultaneous separation system includes: a solution distributor (30) for distributing a separation solution in seven directions; independent columns (80) of the same number as that of the samples, the columns (80) containing resin for chemical separation; a 8-channel tubing pump (60) for separately injecting the samples into the columns (80); first and second 3-way solenoid valves (50, 90) mounted at the front end and the rear end of the columns (80), and a digital pump speed controller (70) for freely controlling injection speed of the samples and solutions according to separation steps.

2 Claims, 4 Drawing Sheets

U.S. PATENT DOCUMENTS

| | | | | |
|---|---|---|---|---|
| 5,770,030 | A * | 6/1998 | Hamacher et al. | 205/43 |
| 6,258,333 | B1 * | 7/2001 | Romanovskiy et al. | 423/10 |
| 6,770,195 | B2 * | 8/2004 | Young et al. | 210/198.2 |
| 6,787,042 | B2 * | 9/2004 | Bond et al. | 210/681 |
| 6,998,052 | B2 * | 2/2006 | Horwitz et al. | 210/638 |
| 2003/0127395 | A1 * | 7/2003 | Bond et al. | 210/682 |

FOREIGN PATENT DOCUMENTS

| | | |
|---|---|---|
| KR | 10-2003-0019932 A | 3/2003 |
| KR | 10-2005-0090199 A | 9/2005 |

OTHER PUBLICATIONS

PTO 10-0657 Translation of Korean Patent Application No. 10-2003-0007579.*

PTO 10-0643 Translation of Korean Patent Application No. 20-2001-0033203.*

* cited by examiner

【Figure 1】
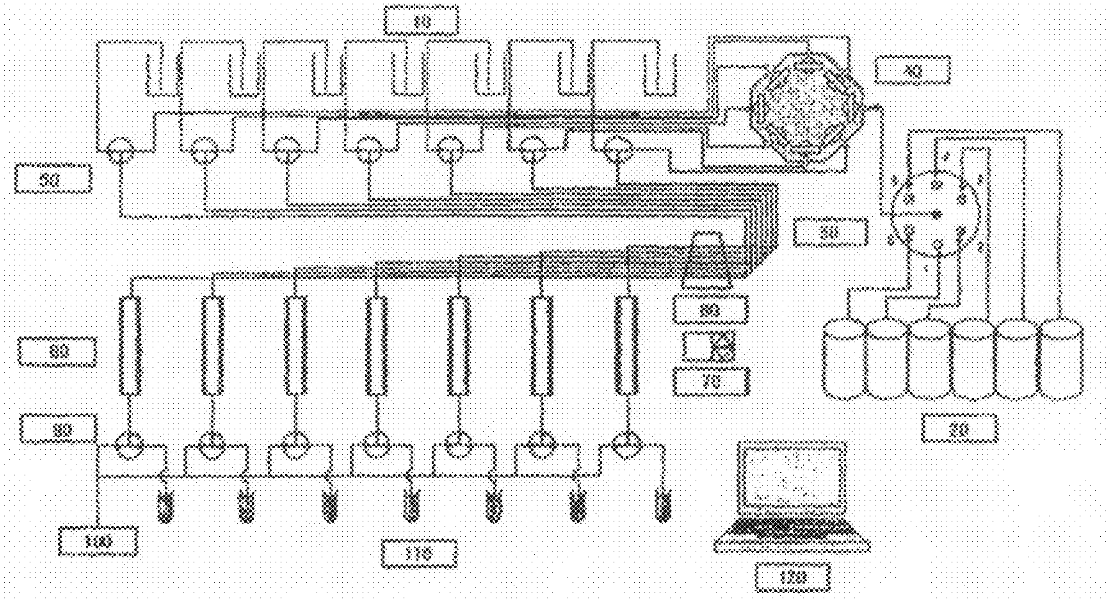
【Figure 2】
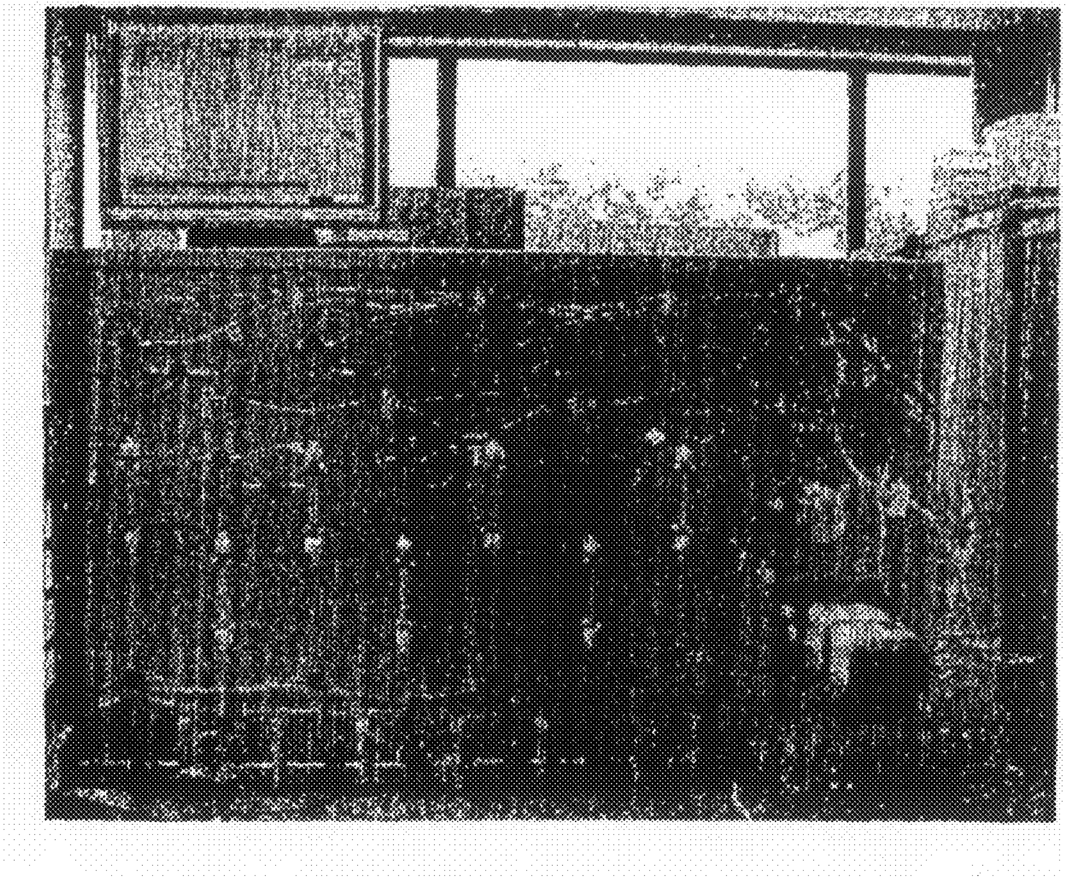

【Figure 3】
(a)
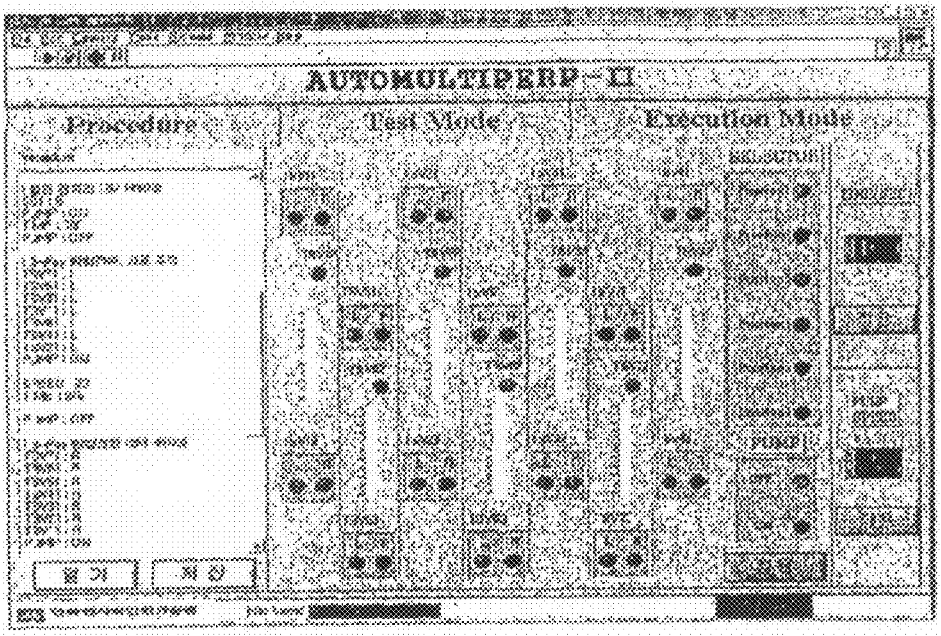
(b)
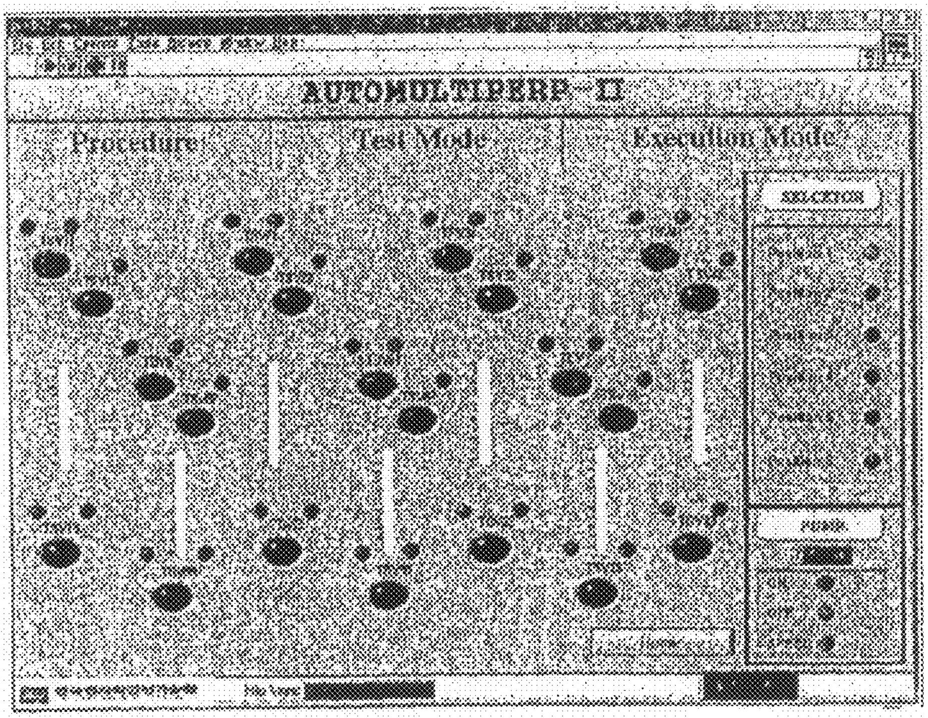

{Figure 3 cont.}
(c)
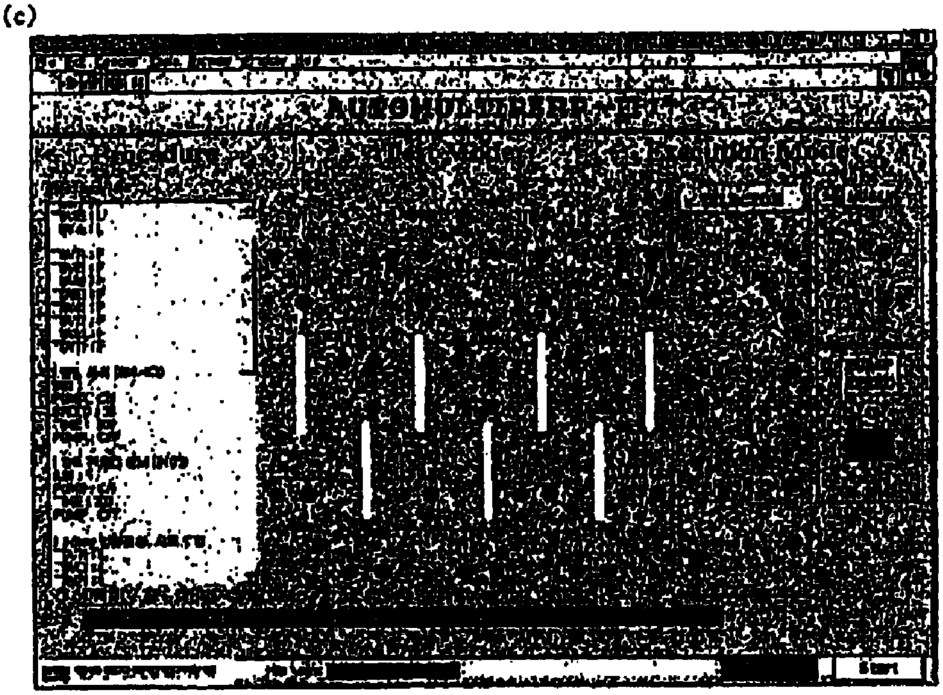
【Figure 4】
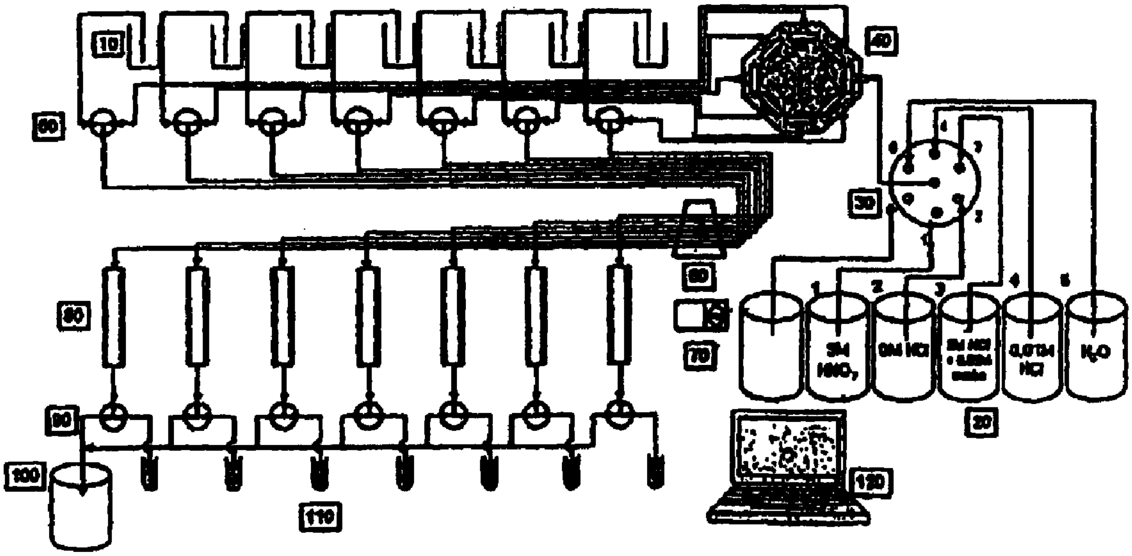

[Figure 5]
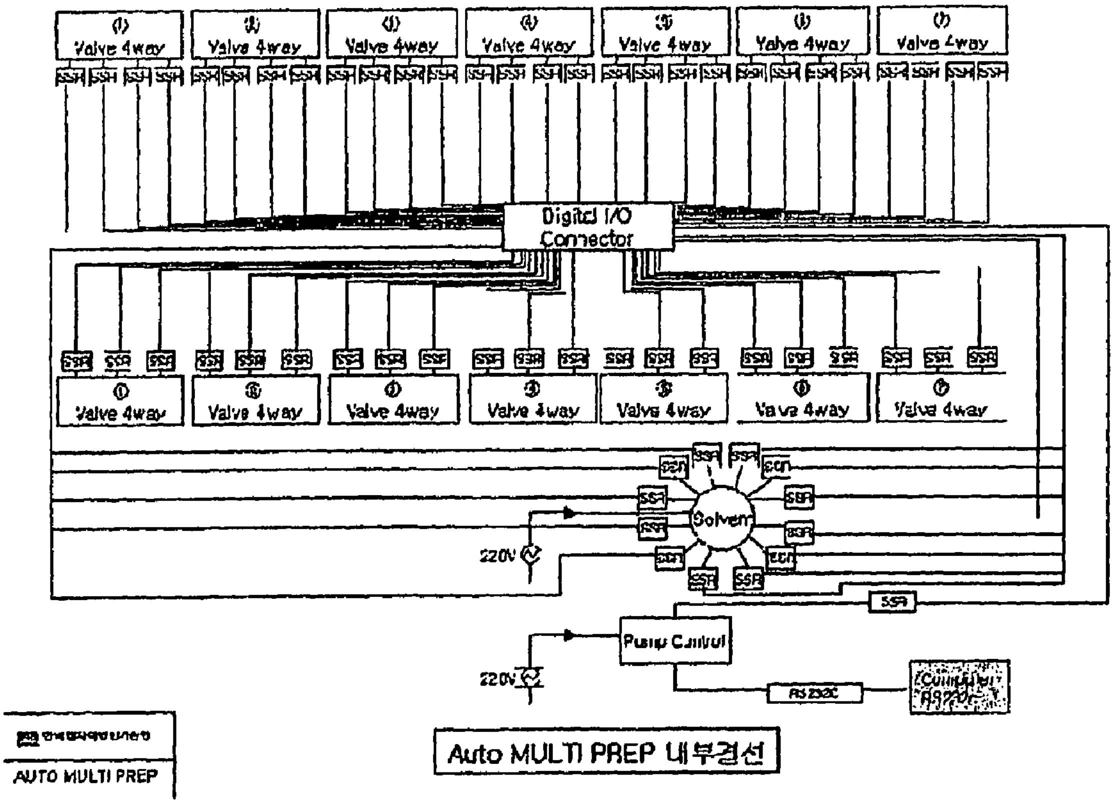

AUTOMATED SIMULTANEOUS SEPARATION SYSTEM FOR RADIONUCLIDES IN MULTIPLE SAMPLES AND A METHOD FOR AUTOMATICALLY SEPARATING URANIUM (U) USING THE SAME

RELATED APPLICATIONS

This application is the U.S. National Phase under 35 U.S.C. 371 of International Application No. PCT/KR2006/000481, filed on Feb. 10, 2006, which in turn claims the benefit of Korean Application No. 10-2006-0005730, filed on Jan. 19, 2006, the disclosures of which Applications are incorporated by reference herein.

TECHNICAL FIELD

The present invention relates to an automated simultaneous separation system for radionuclides in multiple samples and a method for automatically separating uranium (U) using the same, which can automatically and simultaneously separate multiple samples using resin for chemically pure separation of elements existing in environmental samples, an on-line solution conveying device and an automatic control program.

The present invention is an automated system for simultaneously treating multiple samples for chemically pure-separation of radionuclides (Plutonium (Pu), Neptunium (Np), Uranium (U), Thorium (Th), Technetium (Tc), Americium (Am), and Curium (Cm)) in order to monitor environments around nuclear-related facilities or to study movement of radionuclides in the environments.

BACKGROUND ART

In general, an analyzer injects a cleaning solution and an eluate necessary for injection and separation of samples into a glass column through a separatory funnel in order according to a separation procedure using ion exchange resin. At this time, the analyzer has to exchange a sample solution, a cleaning solution and an eluate manually in all steps, and controls an injection speed of each solution using a cock of the separatory funnel or freely drops each solution. However, such separation method has a disadvantage in that it is difficult to reproduce the separation due to a difference in analyzers' experienced skills, the uneven injection speed of solutions, and so on. The injection speed is gradually decreased as time goes by since the injection speed is determined by potential energy of the solutions contained in the separatory funnel, and the samples may not be injected since resin may stop an entrance of the funnel according to composition of the samples. Furthermore, foreign matters may be introduced into the solutions during the separation process since all separation steps are exposed to the outside, and there is a danger in that the analyzer may be injured by harmful gases emitted from an eluent and eluate used during the separation process.

Meanwhile, Korean Patent Application No. 10-2004-0015449 discloses a system for automatically separating radionuclides. However, the system has a disadvantage in that it takes much time to treat multiple samples and the samples used for separation must be exchanged every time since the analyzer has to inject the samples one by one in order. Even though resin for separation is continuously usable so that there is no need to exchange resin each time the samples are exchanged, resin must be exchanged in the case where there is a severe difference in density of analyzed radionuclides between the samples, and residual effects of the previous sample must be considered even in the case where there is no difference in density. For an example, Thermoelectron Company now puts an integrated liquid handling system (PerpLab®) on the market as an automated liquid injection system. The integrated liquid handling system includes a tubing pump, a pinch valve and a two-way 6-port valve. However, the system cannot continuously treat multiple samples, supply all solutions necessary for separation through the valve since a solution flow channel is limited, and control a solution conveying speed during the automatic separation. Moreover, the prior art system has another disadvantage in that it cannot realize a complete automation of the entire chemical separation process and automation of multiple samples since it cannot use an OS program alone without additional auxiliary equipments.

Furthermore, for another example, Korean Utility Model Registration No. 20-0262106 discloses an automated radionuclides-gathering system for extracting radioactive waste resin and waste filters in an atomic power plant. The automated radionuclides-gathering system includes: an ion column and a filter holder connected with each other in parallel in order to gather the radioactive corrosion products; an in-line radioactivity analyzing part mounted in the ion column after drilling the ion column to the thickness as deep as a shielding effect of the ion column is ignored; and a solenoid valve linked to the in-line radioactivity analyzing part for extracting the samples at a wanted radiation dosage setting value.

Additionally, Korean Patent Laid-Open Publication No. 2003-0019932 discloses a method for treating various compounds existing in supercritical water, in which a treatment method of low-level radioactive wastes includes the steps of: converting a high-molecular compound into gas by using Ruthenium Oxides in supercritical water as a catalyst, and at the same time, converting radioactive metal adhered on the high-molecular compound into insoluble oxide; and vitrifying and wasting the radioactive metal converted into insoluble oxide.

However, the prior arts cannot solve the above problems.

DISCLOSURE OF INVENTION

The present invention is an improved system of Korean Patent Application No. 10-2004-0015449 (entitled "automated separation system for automatically separating radionuclides") which has been applied by the same applicant.

It is an object of the present invention to provide an automated simultaneous separation system for radionuclides in multiple samples and a method for automatically separating uranium (U) using the same, which can test performance of each part and execute the entire operation through a remote control, thereby minimizing damages by radiation bombing when radioactive wastes of high level of radioactivity are chemically separated and permitting a rapid separation of a polluted area when radiation accident occurs.

Each of samples has an independent column containing resin for chemical separation therein, a selective solution flow channel, and a sample injection line and the final extraction line. A cleaning solution and an eluate are supplied to the independent columns equally through a 7-directional solution distributor and an 8-channel tubing pump, and at this time, the columns containing resin for chemical separation are adjustable for adjusting length of the column so as to treat multiple samples. Operations of the parts are controlled by a computer and a control interface. All separation processes are automatically progressed by an OS program, so that manpower is saved, recurrence of analyzed results is improved, and a separation time period is remarkably reduced through a simultaneous treatment of multiple samples. Furthermore, the present invention can guarantee durability and prevent leakage of harmful acid vapor since it is made of acid-resistant material.

BRIEF DESCRIPTION OF DRAWINGS

In drawings,

FIG. 1 is a structural view of an automated simultaneous separation system according to the present invention;

FIG. 2 is a photograph of the automated simultaneous separation system according to the present invention;

FIGS. 3(*a*) to (*c*) show screens of a test mode and an execution mode of an OS program of the automated simultaneous separation system according to the present invention;

FIG. 4 is a flow chart showing operation of the automated simultaneous separation system according to the present invention; and FIG. 5 is a circuit view of the automated simultaneous separation system according to the present invention.

BEST MODE FOR CARRYING OUT THE INVENTION

Reference will now be made in detail to the preferred embodiments of the present invention, examples of which are illustrated in the accompanying drawings.

The present invention relates to an automated simultaneous separation system for radionuclides in multiple samples using an automated separation system for simultaneously separating multiple samples and a control program to promote efficiency in chemically pure separation of radionuclides and a method for automatically separating uranium (U) using the same.

The automated simultaneous separation system includes: a sample container 10 for separately containing seven samples therein; a solution supply container 20 for containing a cleaning solution and an eluate necessary for separation of the samples; a solution selection valve 30 mounted in front of the solution supply container 20 for selectively injecting a solution necessary for cleaning and extraction; a 7-directional solution distributor 40 for distributing the separation solution in seven directions and supplying the separated solutions into seven independent columns; first 3-way solenoid valves 50 (SV11, SV21, SV31, SV41, SV 51, SV61 and SV71) for controlling flow channels of the samples and the separation solutions; second 3-way solenoid valves 90 (SV12, SV 22, SV32, SV42, SV52, SV62 and SV72) for controlling a flow channel of the final eluate; a multi-channel tubing pump 60 connected to the first 3-way solenoid valves 50 in front for conveying solutions; a pump speed controller 70 for controlling speed of the multi-channel tubing pump 60; columns 80 containing resin for chemical separation, connected to the pump speed controller 70 and used for chemical separation of radionuclides contained in the samples; a waste solution recovery tank 100 connected to an end of the second 3-way solenoid valve for recovering waste solution generated during a separation process; an eluate recovery tank 110 for collecting the final eluate; and an OS program 120 and an interface for controlling each of the components and automatically controlling the entire system according to input separation program procedures.

In the present invention, considering characteristics in separation of radionuclides using lots of strong acid, all solution-conveying passageways are connected with acid-resistant tubes, and each of the components is made of acid-resistant material. Moreover, all connection portions are connected without gaps in order to smoothly convey an injection solution, and 7 independent separation modules are arranged in a zigzag form so as to utilize spaces effectively.

All solution container lids respectively have fine holes in which only PEEK (Polyether Ether Ketton) tubing can be inserted in order to prevent leakage of harmful gases, prevent pollution due to the outside foreign elements, and keep a sealed state of a solution. Flow channels between the components using acid-resistant PTFE (Polytetra Fluoro Ethylene) tubing are connected with each other using PEEK nuts and Tefzel Ferrule in order to keep sealability. For the multi-channel tubing pump 60, acid-resistant Tygon® MH Peristaltic tubes are used. The solution is separated through the sample supply tubs and the eluate recovery tank during the second sealing of the solution.

As shown in FIGS. 1 and 2, the present invention includes a solution injection part for supplying a separation solution to the samples and the columns, a solution conveying part having the multi-channel tubing pump and the pump speed controller for controlling conveyance and injection speed of all solutions, a chemical separation part for selectively separating wanted nuclides using resin for chemical separation, a flow channel selection part for selection of the flow channels of the injection solution and the final eluate, and a PC control part for controlling the above parts and executing automation of the parts.

The solution injection part includes the sample container for keeping the seven samples, the solution supply container 20 for keeping the cleaning solution and the eluate, the solution selection valve 30 for selecting separation solutions, and the solution distributor 40 for distributing the selected solutions in seven directions. The solution supply container 20 contain 5M nitric acid, 1M nitric acid, 9M nitric acid, 5M hydrochloric acid, and pure water necessary for separation of uranium (U). For the sample container 10 and the solution supply container 20, acid-resistant Teflon bottles are used. In order to absorb the solution, the fine hole of a tube diameter is formed at the center of the solution supply container, the PEEK tube is inserted into the hole, and then, the solution is absorbed into the tube by absorptive power of the multi-channel tubing pump 60. In the case of the sample container, a tube is located to the lower end of the tub so as to absorb all solutions. At this time, in the case of a container having a flat floor, the container is inclined, and then, the PEEK tube is located at the lowermost end of the inclined container. The solution selection valve 30 has six inlet ports, and an outlet port formed at the center thereof. When the valve is operated, the selected solution flows to inlet ports of the solution distributor 40 and the acid-resistant PTFE through the outlet port of the solution selection valve 30. The solution distributor 40 is an octagonal form and has eight ports by arranging one port on one side. One of the eight ports of the solution distributor 40 is the inlet port connected with the outlet port of the solution selection valve 30, and the other seven ports are outlet ports, which are connected to the seven columns. Each port has a locking device, so that the solution is injected only to the column used when the sample of a small amount is separated. After completion of the separation, the inlet port is closed, and then, a cartridge of the multi-channel tubing pump 60 is opened, so that the expandable multi-channel tubing pump 60 can keep its healthiness.

The solution conveying part includes the multi-channel tubing pump 60, acid-resistant tubing, and the pump speed controller 70. The multi-channel tubing pump 60 has eight channels, and each channel uses expandable and acid-resistant Tygon® MH tubing. The tubing is fixed to tubing latches located at both ends of the lower portion of the cartridge, and compressed on a roller of the pump, so that solution absorptive power is generated using the inside vacuum state of the expandable tube when the roller is rotated so as to convey the solution in one direction. After the use, the cartridge is opened from the roller in order to keep the expandability of the tube for a long time. The pump speed controller 70 can control the injection speed of the solution to 1.6 rpm~160 rpm, and the control of the injection speed can be selected in a check mode and an input mode of the OS program. Therefore, the injection speed of the solution can be always kept uniformly and properly controlled according to separation steps so as to permit verified and precise chemical separation.

The chemical separation part for selectively separating the wanted nuclides using resin for the chemical separation includes the resin for selecting wanted nuclides and the columns 80 made of borosilicate containing resin therein. Frit capable of supporting the resin of fine particles and PEEK coupling screws connected with the acid-resistant PTFE tubing are located at both ends of the column. The frit column can support an amount of the resin to 0.1~2.4 mL according to an amount of the samples since the size of the column can be freely adjusted using an adjustable plunger having a screw thread formed at an end of the column. Two clamps for supporting the column are mounted on the front surface of one column, so that the column can be freely attached and detached and the column can always stand straight.

The flow channel selection part for selecting the flow channels of the injection solution and the final eluate uses the 3-way solenoid valves. The flow channel selection part includes a front column valve 50 for selecting the sample and the separation solution and a rear column valve 90 for selecting a waste solution and the final eluate. The first 3-way solenoid valve 50 which is the front column valve has three ports: one port being an outlet port connected with the tubing pump, and the two ports being inlet ports respectively connected with the sample container 10 and the solution distributor 40. The first 3-way solenoid valve 50 functions to inject only one of the sample or the injection solution into the column by selecting one of the two inlet ports.

The second 3-way solenoid valve 90, which is the rear column valve, has an inlet port coupled with a flow channel in communication with the column and two outlet ports. One of the outlet ports is connected with the waste solution recovery tank and the other is connected with the eluate recovery tank. Bodies of the 3-way solenoid valves and a poppet valve are made of acid-resistant material. LED lamps are mounted at both sides of the two input ports in order to check which port is opened.

Operations of all parts of the present invention are controlled by a computer through RS-232 control network and a digital input and output PCI card. The OS program includes an edit mode for input, edition and storing of the separation process, a test mode for performance inspection and optimization of each part, and an execution mode for execution and display of an executed state of input programs.

FIG. 3 shows the edit mode, the test mode and the execution mode of the OS program. In the edit mode, the OS program shows the same arrangement and form as the system for an operator's convenience. When the operator selects an operation mode and operation time of each part and presses the corresponding button, corresponding contents are displayed on a procedure box. The operator can select one of six injection solutions through the solution selection valve 30, select the rotational frequency of the pump and start and stop of the pump through the 8-channel tubing pump 60, and select the injection flow channel or the discharge flow channel through the 3-way solenoid valve. The OS program shows a time setting function so that the operator can set an operation time period of each part, and all selected matters are input when the operator presses corresponding buttons. Moreover, the operator can directly input instructions since the instructions are simple and there are small kinds of the instructions. Additionally, the OS program has all functions of a general text editor for permitting the operator to easily edit, amend and store the input contents. In the test mode, the OS program shows the same arrangement and form as the edit mode. Operation of each part can be tested independently, and is indicated by a change of colors. The operator can convert the test mode into the edit mode or the execution mode during test by pressing a "Home" button for converting the present mode into an initialization state. The operator can progress the input program by pressing a "Start" button in the execution mode, and then, the operations of all parts are displayed in real time at the same time with the start of separation. The progress of the entire separation process is indicated by a status bar, and the separation process can be stopped when the operator presses a "Stop" button which is a toggle button if the "Start" button.

FIG. 4 shows a procedure box for inputting separation procedures by each step of the chemical separation process. Table 1 shows instructions for selecting and operating each part. Execute (EXEC) statement is formed in such a way as to be executed one operation by one line, and the entire separation process is terminated by an instruction of "TIME: 0". The input separation procedure contents can be copied and removed like general text for the operator's convenience in input, and the completed contents can be stored in one file, whereby various separation procedures can be made. Additionally, the operator can make out an explanation by using a "!" instruction to show contents of the input EXEC statement.

The first step is an atmosphere creating step to create the column into an atmosphere for absorbing uranium (U) before injection of the sample. To create the atmosphere for absorbing uranium (U), 3M nitric acid ($HNO_3$) is injected into the column made of Borosilicate material filled with UTEVA® resin (product name of Eichrome Company in United States) so as to convert UTEVA® resin into nitric acid group.

A second step is to inject the sample. 3M nitric acid-based sample solution is absorbed by absorptive force of the tubing pump, and injected into the column through the left port of the 3-way solenoid valve. At this time, the sample solution uses the flow channel different from that of the separation solution. At the same time with the injection of the sample, not only multiple elements contained in the sample but also other elements except uranium (U) can be separated, whereby most of elements except uranium (U) are removed. The solution passing through resin is conveyed to the waste solution recovery tank through a passageway through which 3M nitric acid is conveyed.

The third step is a cleaning step for improving the degree of purity of uranium (U) by removing some elements remaining in the tube and resin through which the sample is conveyed. In this step, 5M HCI-0.05M oxalic acid mixture is added in order to clean and remove 3M nitric acid and Th.

The fourth step is the final separation (extraction) step to recover uranium (U). Uranium (U) absorbed on resin is recovered by using 0.01M hydrochloric acid, and the recovered solution is used for measurement. The optimum extraction volume is determined in consideration of a time period that the solution arrives from the solution selection valve to the column.

Hereinafter, a preferred embodiment of the present invention will be described in more detail.

PREFERRED EMBODIMENT

First Step

Preparatory Step

All columns (80) are filled with resin for separating of uranium (U) (UTEVA®) to the height of 4 cm, and each sample is put in the sample container 10. The PEEK tube for absorbing the sample solution is inserted into the lower end portion of the sample container of the corresponding sample number. After that, the waste solution recovery tank 100 and the eluate recovery tank 110 are located at their own position, and the cartridge of the 8-channel tubing pump 60 is compressed on the roller, the inlet port of the solution distributor 40 is opened to open the flow channel of the solution, and then, the separation step is prepared by the OS program. The separation system is set in such a way that the computer controls operations of all parts using the RS-232 control network and the digital input and output PCI card. When the operator tests operations of all parts in the test mode of the OS program, inputs each separation step in the edit mode for inputting the separation procedure, and presses the "Start" button in the execution mode in order to execute the input separation program, the second step is executed by instructions of the OS program.

Second Step

Atmosphere Creating Step

First, after the right port of the first 3-way solenoid valve 50 and the left port of the second 3-way solenoid valve are opened, 3M nitric acid ($HNO_3$) is selected by the solution selection valve 30. After that, the 8-channel tubing pump 60 is operated at flow speed of 2 mL per minute for 600 seconds by control of the pump speed controller 70 so as to supply 3M nitric acid of about 20 mL to the columns 80 containing resin for chemical separation. After that, the 8-channel tubing pump 60 is stopped, and the generated waste solution is recovered to the waste solution recovery tank 100.

Third Step

Sample Injection Step

After completion of the second step, when the left port of the first 3-way solenoid valve 50 is opened, the 8-channel tubing pump 60 is operated at flow speed of 1 mL per minute during a time period when the entire injection samples are injected, so that the samples are injected into the columns 80 from the sample container 10. After that, the 8-channel tubing pump 60 is stopped.

Fourth Step

Column Cleaning Step

When the right port of the first 3-way solenoid valve 50 is opened, 30 mL of a first solution, 5 mL of a second solution and 20 mL of a third solution in the solution selection valve 30 are respectively supplied into the columns at speed of 2 mL per minute, and then, the 8-channel tubing pump 60 is stopped.

Fifth Step

Separation (Extraction) Step

After the flow channel of the final eluate is changed by opening the right port of the second 3-way solenoid valve 90, the fourth eluate is selected in the solution selection valve 30. The 8-channel tubing pump 60 is operated at speed of 2 mL per minute for 600 seconds, whereby the entire uranium absorbed on the columns 80 containing resin for chemical separation is extracted by the eluate of 20 mL. After that, when the left port of the second 3-way solenoid valve 90 is opened and the fifth solution (water) is selected in the solution selection valve 30, the columns 80 containing resin for chemical separation and the lines are cleaned and uranium (U) is automatically separated.

Hereinafter, referring to the drawings, the present invention will be described in more detail.

FIG. 1 is a structural view of an automated simultaneous separation system according to the present invention, FIG. 2 is a photograph of the automated simultaneous separation system according to the present invention, FIGS. 3(*a*) to (*c*) show screens of a test mode and an execution mode of an OS program of the automated simultaneous separation system according to the present invention, FIG. 4 is a flow chart showing operation of the automated simultaneous separation system according to the present invention, and FIG. 5 is a circuit view of the automated simultaneous separation system according to the present invention. In the drawings, the sample container 10 for containing the sample, the solution container 20, the solution selection valve 30, the 7-directional solution distributor 40, the first 3-way solenoid valve 50, the second 3-way solenoid valve 90, the multi-channel tubing pump 60, the pump speed controller 70, the columns 80, the waste solution recovery tank 100, the eluate recovery tank 110, and the OS program 120 are shown.

As shown in FIGS. 1 to 4, the automated simultaneous separation system according to the present invention includes: the sample container 10 for separately containing seven samples; the solution supply container 20 for containing cleaning solution and eluate necessary for separation of the samples; the solution selection valve 30 mounted in front of the solution supply container 20 for selectively injecting solution necessary for cleaning and extraction; the 7-directional solution distributor 40 for distributing the separation solution in seven directions and supplying the separated solutions to seven independent columns; the first 3-way solenoid valves 50 (SV11, SV21, SV31, SV41, SV 51, SV61 and SV71) connected to a side of the solution distributor 40 and the sample container 10 for controlling flow channels of the samples and the separation solutions; the multi-channel tubing pump 60 connected to the other side of the first 3-way solenoid valves 50 for conveying solutions; the pump speed controller 70 for controlling speed of the multi-channel tubing pump 60; the columns 80 containing resin for chemical separation therein, used for chemical separation of radionuclides contained in the samples conveyed by the 8-channel tubing pump 60; the second 3-way solenoid valves 90 (SV12, SV 22, SV32, SV42, SV52, SV62 and SV72) connected to the lower portion of the column 80 for controlling flow channels of the final eluate; the waste solution recovery tank 100 connected to an end of the second 3-way solenoid valve 90; the eluate recovery tank 110 for collecting the final eluate; and the OS program 120 and an interface for controlling each of the parts and automatically controlling the entire system according to input separation program procedures. FIG. 5 is a circuit view of the automated simultaneous separation system according to the present invention in detail.

INDUSTRIAL APPLICABILITY

As described above, the present invention remarkably reduces a time period and manpower necessary for exchange of samples and solutions by automatically and simultaneously separating multiple samples, whereby economics and efficiency in separation of radionuclides are remarkably improved, and quality in analysis is improved by enhancing recurrence of separation and separation efficiency through a precise control of the injection speed and injection amount of the solutions. Furthermore, the separation system according to the present invention can minimize damages by radiation bombing when the samples of high level of radioactivity are chemically separated since this system can be automatically operated by a remote control of the computer.

Furthermore, this system can be used for complicated chemical separation using various catalysts since at most six catalysts can be selectively injected. This system can be widely utilized and sufficiently show its all functions even in a poor chemical separation condition where strong acid and strong base are used since the entire system of the present invention is made of acid-resistant and base-resistant materials and all parts are connected with one another via lines and have good sealability. Meanwhile, this system can use all samples from a small volume to a large volume by easily adjusting the content of resin according to an amount of the analyzed sample since the columns containing resin for chemical separation are adjustable.

Moreover, this system will be widely utilized in general experiments since it can test performance of each part through independent control of each part by the test mode of the OS program and be applied to generally chemical separation experiments using resin and tubes, for example, a performance test of columns, investigation of the optimum condition, and distribution, dilution and filtering of a solution through a partial operation.

The automated simultaneous separation system according to the present invention is now produced as a prototype product, and used as an automated separation system for analyzing an isotope of uranium (U) and thorium (Th) of the samples in a study site (laboratory in Korea Institute of Nuclear Safety), and will greatly contribute to secure efficiency and rapidity in analysis if it is utilized in the art related with analysis of radionuclides.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for automatically separating uranium (U) using an automated simultaneous separation system for radionuclides in multiple samples, the method comprising the following steps:

a first step (preparatory step) of filling all columns (80) with resin for separating of uranium (U) to the height of 4 cm, putting each sample in a sample container (10), inserting a PEEK tube for absorbing the sample solution into the lower end portion of the sample container (10) of the corresponding sample number, locating a waste solution recovery tank (100) and an eluate recovery tank (110) at their own position, compressing a cartridge of a 8-channel tubing pump (60) on a roller, opening an inlet port of a solution distributor (40) to open a flow channel of the solution, and preparing a separation step using an OS program which is set to control operations of all parts by a computer using RS-232 control network and a digital input and output PCI card, testing operation of each part in a test mode of the OS program, inputting each separation step in an edit mode of the OS program, and pressing a start button in an execution mode of the OS program in order to execute input separation program;

a second step (atmosphere creating step) of opening the right port of a first 3-way solenoid valve (50) and the left port of a second 3-way solenoid valve (90), selecting 3M nitric acid ($HNO_3$) by a solution selection valve (30), operating the 8-channel tubing pump (60) at flow speed of 2 mL per minute for 600 seconds by control of a pump speed controller (70) so as to supply about 20 mL of 3M nitric acid to the columns (80), stopping operation of the 8-channel tubing pump (60), and recovering the generated waste solution to the waste solution recovery tank (100);

a third step (sample injection step) of opening the left port of the first 3-way solenoid valve (50) after completion of the second step, operating the 8-channel tubing pump (60) at flow speed of 1 mL per minute during a time period when the entire injection samples are injected so that the samples are injected into the columns 80 from the sample container 10, and stopping operation of the 8-channel tubing pump (60);

a fourth step (column cleaning step) of opening the right port of the first 3-way solenoid valve (50), respectively supplying 30 mL of a first solution, 5 mL of a second solution and 20 mL of a third solution into the columns at speed of 2 mL per minute by the solution selection valve 30, and stopping operation of the 8-channel tubing pump (60); and a fifth step (separation (extraction) step) of opening the right port of the second 3-way solenoid valve (90) in order to change a flow channel of the final eluate, selecting the fourth eluate by the solution selection valve (30), operating the 8-channel tubing pump (60) at speed of 2 mL per minute for 600 seconds so as to extract the entire uranium absorbed on the columns (80) by 20 mL of the eluate, opening the left port of the second 3-way solenoid valve (90), and selecting the fifth solution (water) by the solution selection valve (30), whereby the columns (80) and lines are cleaned and uranium (U) is separated from the sample.

2. An automated simultaneous separation system for radionuclides in multiple samples, the separation system comprising:

a sample container (10) for separately containing seven samples;

a solution supply container (20) for containing a cleaning solution and an eluate necessary for separation of the samples;

a solution selection valve (30) mounted in front of the solution supply container (20) for selectively injecting a solution necessary for cleaning and extraction;

a 7-directional solution distributor (40) for distributing a separation solution in seven directions and supplying the separated solutions to seven independent columns;

first 3-way solenoid valves (50) (SV11, SV21, SV31, SV41, SV 51, SV61 and SV71) connected to a side of the solution distributor (40) and the sample container (10) for controlling flow channels of the samples and the separation solutions;

a multi-channel tubing pump (60) connected to the other side of the first 3-way solenoid valves (50) for conveying solutions;

a pump speed controller (70) for controlling speed of the multi-channel tubing pump (60);

columns (80) containing resin for chemical separation, the columns (80) being used for chemical separation of radionuclides contained in the samples conveyed by the 8-channel tubing pump (60);

second 3-way solenoid valves (90) (SV12, SV 22, SV32, SV42, SV52, SV62 and SV72) connected to the lower portion of the columns (80) for controlling flow channels of the final eluate;

a waste solution recovery tank (100) connected to an end of the second 3-way solenoid valve (90);

an eluate recovery tank (110) for collecting the final eluate; and an OS program (120) and an interface for controlling each of the parts and automatically controlling the entire system according to input separation program procedures.

* * * * *